(12) United States Patent
Marchon et al.

(10) Patent No.: US 12,054,402 B2
(45) Date of Patent: Aug. 6, 2024

(54) WATER HARVESTING SYSTEMS, AND METHODS OF USING THEREOF

(71) Applicant: Water Harvesting Inc., Newark, CA (US)

(72) Inventors: Bruno Marchon, Palo Alto, CA (US); Ievgen Kapustin, Sunnyvale, CA (US); William Daniel Gallo, Los Gatos, CA (US); Taber Smith, Saratoga, CA (US); Grant Glover, Spanish Fort, AL (US)

(73) Assignee: Water Harvesting Inc., Newark, CA (US)

( * ) Notice: Subject to any disclaimer, the term of this patent is extended or adjusted under 35 U.S.C. 154(b) by 356 days.

(21) Appl. No.: 17/424,147

(22) PCT Filed: Jan. 22, 2020

(86) PCT No.: PCT/US2020/014647
§ 371 (c)(1),
(2) Date: Jul. 19, 2021

(87) PCT Pub. No.: WO2020/154427
PCT Pub. Date: Jul. 30, 2020

(65) Prior Publication Data
US 2022/0106203 A1 Apr. 7, 2022

Related U.S. Application Data

(60) Provisional application No. 62/795,332, filed on Jan. 22, 2019.

(51) Int. Cl.
*C02F 1/14* (2023.01)
*C02F 1/18* (2023.01)
*C02F 1/28* (2023.01)

(52) U.S. Cl.
CPC .................. *C02F 1/14* (2013.01); *C02F 1/18* (2013.01); *C02F 1/28* (2013.01); *C02F 2201/004* (2013.01); *C02F 2201/005* (2013.01)

(58) Field of Classification Search
None
See application file for complete search history.

(56) References Cited

U.S. PATENT DOCUMENTS

| | | | |
|---|---|---|---|
| 1,559,762 | A | 11/1925 | Newman |
| 4,304,577 | A | 12/1981 | Ito et al. |

(Continued)

FOREIGN PATENT DOCUMENTS

| | | |
|---|---|---|
| CA | 3120865 | 7/2023 |
| CN | 102639540 A | 8/2012 |

(Continued)

OTHER PUBLICATIONS

Wang (KR-100750375-B1)—Cooling or Heating Combined System Using 2-Passline Waste Water Exchanger and Heat Pump (with translation). (Year: 2007).*

(Continued)

*Primary Examiner* — Hayden Brewster
(74) *Attorney, Agent, or Firm* — Craig R. Miles; CR MILES P.C.

(57) ABSTRACT

Provided herein are water harvesting systems, as well as methods using such systems, for capturing water from surrounding air. The systems and methods use water capture materials to adsorb water from the air. For example, the water capture materials may be metal-organic-frameworks. The systems and methods desorb this water in the form of water vapor, and the water vapor is condensed into liquid water and collected. The liquid water is suitable for use as drinking water.

19 Claims, 8 Drawing Sheets

(56) References Cited

U.S. PATENT DOCUMENTS

| | | | |
|---|---|---|---|
| 4,646,541 | A | 3/1987 | Reid et al. |
| 5,565,139 | A | 10/1996 | Walker et al. |
| 5,632,802 | A | 5/1997 | Grgich et al. |
| 6,684,648 | B2 | 2/2004 | Faqih |
| 8,627,673 | B2 | 1/2014 | Hill et al. |
| 9,446,969 | B1 | 9/2016 | Redman et al. |
| 10,266,737 | B2 | 4/2019 | Van Horn et al. |
| 10,695,741 | B2 | 6/2020 | Motkuri et al. |
| 11,029,045 | B2 | 6/2021 | Woods et al. |
| 2004/0107832 | A1 | 6/2004 | Tongue et al. |
| 2004/0244398 | A1 | 12/2004 | Radermacher et al. |
| 2005/0044862 | A1 | 3/2005 | Vetrovec et al. |
| 2006/0130652 | A1 | 6/2006 | Takewaki et al. |
| 2007/0028769 | A1 | 2/2007 | Eplee et al. |
| 2009/0151368 | A1 | 6/2009 | Bar |
| 2009/0260385 | A1 | 10/2009 | Hill et al. |
| 2010/0126344 | A1 | 5/2010 | Stein et al. |
| 2011/0056220 | A1 | 3/2011 | Caggiano |
| 2011/0088552 | A1 | 4/2011 | Ike et al. |
| 2011/0296858 | A1 | 12/2011 | Caggiano |
| 2012/0172612 | A1 | 7/2012 | Yaghi et al. |
| 2013/0036913 | A1 | 2/2013 | Fukudome |
| 2013/0061752 | A1 | 3/2013 | Farha et al. |
| 2013/0192281 | A1 | 8/2013 | Nam et al. |
| 2013/0312451 | A1 | 11/2013 | Max |
| 2014/0138236 | A1 | 5/2014 | White |
| 2014/0165637 | A1 | 6/2014 | Ma |
| 2014/0287150 | A1 | 9/2014 | Miljkovic et al. |
| 2014/0338425 | A1 | 11/2014 | Kalbassi et al. |
| 2016/0030858 | A1 | 2/2016 | Giacomini |
| 2016/0084541 | A1 | 3/2016 | Aguado et al. |
| 2016/0334145 | A1 | 11/2016 | Pahwa et al. |
| 2017/0008915 | A1 | 1/2017 | Yaghi et al. |
| 2017/0113184 | A1 | 4/2017 | Eisenberger |
| 2017/0129307 | A1 | 5/2017 | Zhou et al. |
| 2017/0211851 | A1 | 7/2017 | Feng et al. |
| 2017/0234576 | A1 | 8/2017 | Kawagoe et al. |
| 2017/0354920 | A1 | 12/2017 | Switzer et al. |
| 2018/0043295 | A1 | 2/2018 | Friesen et al. |
| 2018/0171604 | A1 | 6/2018 | Kim et al. |
| 2018/0209123 | A1 | 6/2018 | Bahrami et al. |
| 2018/0261882 | A1 | 9/2018 | Chang et al. |
| 2019/0100903 | A1 | 4/2019 | Panda et al. |
| 2019/0234053 | A1 | 8/2019 | Kim et al. |
| 2020/0009497 | A1 | 1/2020 | Matuska et al. |
| 2020/0206679 | A1 | 7/2020 | Stuckenberg |
| 2020/0283997 | A1 | 9/2020 | Salloum et al. |
| 2020/0316514 | A1 | 10/2020 | Fuchs et al. |
| 2020/0363078 | A1 | 11/2020 | Mulet et al. |
| 2021/0062478 | A1 | 3/2021 | Friesen et al. |
| 2021/0156124 | A1* | 5/2021 | Yaghi ............... B01D 53/0462 |
| 2021/0237535 | A1 | 8/2021 | Goel et al. |
| 2021/0283528 | A1 | 9/2021 | Pokorny et al. |
| 2021/0283574 | A1 | 9/2021 | Yaghi et al. |
| 2022/0170247 | A1 | 6/2022 | Yaghi et al. |
| 2022/0389691 | A1 | 12/2022 | Kuo et al. |
| 2023/0063572 | A1 | 3/2023 | Kapustin |
| 2023/0264138 | A1 | 8/2023 | McGrail et al. |

FOREIGN PATENT DOCUMENTS

| | | |
|---|---|---|
| CN | 106029674 A | 10/2016 |
| CN | 1077722290 A | 2/2018 |
| CN | 114182784 A | 3/2022 |
| EP | 2507247 A1 | 10/2012 |
| GB | 2540798 A | 2/2017 |
| JP | S63-107720 A | 5/1988 |
| JP | 2013-512223 A | 4/2013 |
| JP | 2017-509607 A | 4/2017 |
| JP | 2018080146 A | 5/2018 |
| WO | WO 03/097216 A1 | 11/2003 |
| WO | WO 2015/127033 A1 | 8/2015 |
| WO | WO2016/186454 A1 | 11/2016 |
| WO | WO 2018/118377 A1 | 6/2018 |
| WO | WO-2019010102 A1 | 1/2019 |
| WO | WO 2019/058158 A1 | 3/2019 |
| WO | WO 2019/082000 A1 | 5/2019 |
| WO | WO-2019152962 A2 | 8/2019 |
| WO | WO-2020036905 A1 | 2/2020 |
| WO | WO 2020/099561 A1 | 5/2020 |
| WO | WO-2020112899 A1 | 6/2020 |
| WO | WO 2020/154427 A1 | 7/2020 |
| WO | WO-2021034477 A1 | 2/2021 |
| WO | WO-2021067179 A1 | 4/2021 |
| WO | WO 2021/162894 A1 | 8/2021 |
| WO | WO 2023/146800 A1 | 8/2023 |

OTHER PUBLICATIONS

PCT International Patent Application No. PCT/US22/12990, International Search Report and Written Opinion of the International Searching Authority dated Apr. 7, 2021, 14 pages.

Janiak et al. Solid-Solution Mixed-Linker Synthesis of Isoreticular Al-Based MOFs for and Easy Hydrophilicity Tuning in Water-Sorption Heat Transformations. Chem. Mater., May 2019, 31, 11, 4051-4062.

Fang et al. One-Pot Synthesis of Two-Linker Mixed Al-Based Metal-Organic Frameworks for Modulated Water Vapor Adsorption. Cryst. Growth Des., Aug. 2020, 20, 10, 6565-6572.

Global Cooling Prize. Transaera and partner Haier. Website, https://globalcoolingprize.org/transaera-inc/, originally downloaded Nov. 21, 2022, 3 pages.

Furukawa et al., (2014). "Water adsorption in porous metal-organic frameworks and related materials," J. Aril. Chem. Soc., 136:4369-4381.

International Search Report and Written Opinion for International Patent Application No. PCT/US2020/014647, mailed on May 5, 2020, 11 pages.

Kalmutzki et al., (2018). "Metal-Organic Frameworks for Water Harvesting from Air," Adv. Mat., 30(37):1704304.

Kim et al., (2017). "Water harvesting from air with metal-organic frameworks powered by natural sunlight," Science, 356:430-434.

Kummer et al., (2017). "A functional full-scale heat exchanger coated with aluminum fumarate metal-organic framework for adsorption heat transformation," Industrial & Engineering Chemistry Research, 56:8393-8398.

Gleick. Water in Crisis: A Guide to the World's Fresh Water Resources. Chapter 2, pp. 13-24. Aug. 1993, Oxford University Press, New York, USA.

PCT International Patent Application No. PCT/US19/63442, International Search Report and Written Opinion of the International Searching Authority dated Jan. 22, 2020, 7 pages.

PCT International Patent Application No. PCT/US20/53052, International Search Report and Written Opinion of the International Searching Authority dated Jan. 4, 2021, 10 pages.

PCT International Patent Application No. PCT/US21/16261, International Search Report and Written Opinion of the International Searching Authority dated Apr. 16, 2021, 8 pages.

PCT International Patent Application No. PCT/US21/47491, International Search Report and Written Opinion of the International Searching Authority dated Dec. 7, 2021, 9 pages.

PCT International Patent Application No. PCT/US22/26153, International Search Report and Written Opinion of the International Searching Authority dated Jul. 28, 2022, 18 pages.

Ding et al. Carbon capture and conversion using metal-organic frameworks and MOF-based materials. Chem. Soc. Rev., May 2019, 48(2):2783-2828.

Fracaroli et al. Metal-Organic Frameworks with Precisely Designed Interior for Carbon Dioxide Capture in the Presence of Water. Am. Chem. Soc., Jun. 2014, 136, pp. 8863-8866.

Hanikel et al. Rapid Cycling and Exceptional Yield in a Metal-Organic Frameworks for Water Harvester. ACS Cent. Sci., Aug. 2019, 5(10):1699-1706.

Li et al. Incorporation of Alkylamine into Metal-Organic Frameworks through a Brønsted Acid-Base Reaction for CO2 Capture. ChemSusChem., Oct. 2016, 9(19):2832-2840.

Tu et al. Progress and Expectation of Atmospheric Water Harvesting. Joule, Aug. 2018, 2(8):1452-1478.

(56) References Cited

OTHER PUBLICATIONS

Zhou et al. Atmospheric Water Harvesting: A Review of Material and Structural Designs. ACS Materials Lett., May 2020, 2(7):671-684.
PCT International Patent Application No. PCT/US22/41142, International Search Report and Written Opinion of the International Searching Authority dated Jan. 20, 2023, 12 pages.
Canivet et al. Water adsorption in MOFs: fundamentals and applications. Chem. Soc. Rev., Aug. 2014, 43(16):5594-5617.
Clus et al. Study of dew water collection in humid tropical islands. Hydrol., Oct. 2008, 361(1-2):159-171.
Fathieh et al. Practical water production from desert air. Sci. Adv., Jun. 2018, 4(6):eaat3198.
Klemm et al. Fog as a Fresh-Water Resource: Overview and Perspectives. Ambio, May 2012, 41(3):221-234.
Lee et al. Water harvest via dewing. Langmuir, Jun. 2012, 28(27):10183-10191.
Muselli et al. Dew water collector for potable water in Ajaccio (Corsica Island, France). Atmos. Res., Sep. 2002,64,297-312.
Park et al. Optimal Design of Permeable Fiber Network Structures for Fog Harvesting. Langmuir, Oct. 2013, 29(43):13269-13277.
Schemenauer et al. A Proposed Standard Fog Collector for Use in High-Elevation Regions. Appl. Meteorol., Nov. 1994, 33(11):1313-1322.
Wahlgren. Atmospheric Water Vapour Processor Designs for Potable Water Production: A Review. Water Res., Jan. 2001, 35(1):1-22.
PCT International Patent Application No. PCT/US23/33098, International Search Report and Written Opinion of the International Searching Authority dated Nov. 30, 2023, 11 pages.
Brazilian Patent Application No. BR112021010139-0, Office Action mailed Jul. 9, 2023, 4 pages.
Brazilian Patent Application No. BR112021002648-7, Office Action mailed Jul. 3, 2023, 4 pages.
Canadian Patent Application No. 3,171,282, Office Action dated Oct. 27, 2023, 11 pages.
Canadian Patent Application No. 3,167,734, Office Action dated Aug. 31, 2023, 6 pages.
Philippine Patent Application No. 1/2021/551201, Substantive Examination Report dated Sep. 6, 2023, 6 pages.
PCT International Patent Application No. PCT/IN23/50258, International Search Report and Written Opinion of the International Searching Authority dated Jul. 4, 2023, 10 pages.
Japanese Patent Application No. 2021-529709, Office Action dated Nov. 21, 2023, 6 pages.
United States U.S. Appl. No. 18/384,992, Office Action mailed Jan. 23, 2024.
United States U.S. Appl. No. 18/077,417, Office Action mailed Jan. 17, 2024.

\* cited by examiner

WATER HARVESTING SYSTEMS, AND METHODS OF USING THEREOF

CROSS-REFERENCE TO RELATED APPLICATIONS

This application is a national stage application under 35 U.S.C. § 371 of International Application No. PCT/US2020/014647, filed internationally on Jan. 22, 2020, which claims priority to U.S. Provisional Application No. 62/795,332, filed Jan. 22, 2019, each of which is incorporated herein by reference in its entirely.

FIELD

The present disclosure relates generally to water harvesting, and more specifically to systems and methods for harvesting water from surrounding air using metal-organic-frameworks and/or other water capture materials.

BACKGROUND

A large percentage of the world's population is experiencing water shortages. The water in the form of vapor and droplets in the atmosphere is a natural resource that could be used to address the global water problem. Dewing from moist air and fog capture are examples of attempts to capture water from air, but such processes require either frequent presence of 100% relative humidity or a large amount of energy. Thus such processes are not commercially viable solutions for capture of water from air. See generally Kim et al., Science 356, 430-434 (2017).

What is desired in the art are commercially viable systems and methods that can harvest water from surrounding air with minimum energy requirements and that can be powered by low-grade energy sources (e.g., sunlight).

BRIEF SUMMARY

In some aspects, provided is a water harvesting system for capturing water from surrounding air. In some embodiments, the system comprises a chamber that has structural elements, condenser(s), gate valve(s) and heat exchange manifold(s). In some variations, each structural element is coated with at least one water capture material. In some variations, the water capture material is a desiccant material. In another variation, the water capture material comprises metal-organic-frameworks (MOFs).

In some variations, the structural elements are plates. In some embodiments, the plates are independently coated on one or both sides with at least one water capture material. In some variations, the plates are arranged parallel to each other, and a gap exists between adjacent plates. In other variations, the structural elements are plates, rods, coils, or cylinders.

The water capture material adsorbs water from surrounding air during an adsorption phase, and desorbs water in the form of water vapor during a desorption phase. One or more condensers are positioned inside the chamber, adjacent to one end of the structural elements (e.g., plates, rods, coils, or cylinders). The condensers condense water vapor into liquid water during a condensation phase. One or more gate valves are configured to open during adsorption and close after adsorption. One or more heat exchange manifolds are connected to, or positioned around, the structural elements. The heat exchange manifolds heat up at least a portion of the structural elements (e.g., by circulating hot process water or other heat transfer agents, irradiation, electric heating, etc.), thereby causing desorption of at least a portion of water sequestered in the water capture material.

The system further comprises one or more fans, which may be internal or external to the chamber. The fans are positioned adjacent to structural elements (e.g., plates, rods, coils, or cylinders), at an end opposite to the condensers. The fans blow air through a gap between adjacent structural elements towards the condensers. In some embodiments, the air is blown parallel to the structural elements, which causes the water capture material to adsorb water from surrounding air.

The system further comprises one or more vacuum pumps connected to the chamber. The vacuum pumps evacuate at least a portion of air out of the chamber when the one or more gate valves in the chamber are closed.

The system further comprises a water storage tank, which receives the liquid water from the condensers in the chamber.

The system may include one or more additional components. For example, in some variations, the system further comprises photovoltaic cells or passive solar captors; or an electrical power source. In other variations, the system further comprises a control system that can monitor and control adsorption, desorption and condensation.

In other aspects, provided is a method of harvesting water from surrounding air using any of the systems descried herein. In some embodiments, provided is a method comprising: adsorbing water into water capture material from surrounding air; desorbing at least a portion of the water from the water capture material in the form of water vapor; and condensing at least a portion of the water vapor to produce liquid water.

DESCRIPTION OF THE FIGURES

The present application can be best understood by reference to the following description taken in conjunction with the accompanying drawing figures, in which like parts may be referred to by like numerals.

DETAILED DESCRIPTION

The following description sets forth exemplary methods, parameters and the like. It should be recognized, however, that such description is not intended as a limitation on the scope of the present disclosure but is instead provided as a description of exemplary embodiments.

In some aspects, provided herein are water harvesting systems designed to capture water out of surrounding air, even in the driest environments, and produce clean drinking water. In some variations, the air has a relative humidity of less than about 30%, less than about 20%, less than about 15%, less than about 10%, less than about 5%, or less than about 1%; or between about 1% and about 20%, between about 1% and about 15%, or between about 10% and about 20%.

The heart of the system is a chamber containing the water capture material. In some embodiments, the chamber contains a plurality of structural elements coated with at least one water capture material. In some variations, the structural elements may be plates, rods, coils, or cylinders, or any combination thereof. The system may be fully enclosed in a container that can easily be deployed to the site wherever water is needed. In some embodiments, the chamber also includes fans for water adsorption, pumps/compressors and water tanks (e.g., both for process water and collection of drinking water). In some variations, the top of the container can also be used to collect solar energy, through passive captors and/or photovoltaic cells.

In other aspects, provided herein are also methods of capturing water from surrounding air using the systems provided herein. In some embodiments, the methods comprise: adsorbing water from surrounding air in the water capture material; desorbing at least a portion of the water from the water capture material in the form of water vapor; and condensing at least a portion of the water vapor using at least one condenser to produce liquid water. The liquid water may be stored. In some variations, the liquid water is drinking water, suitable for human consumption.

Figure 1A:
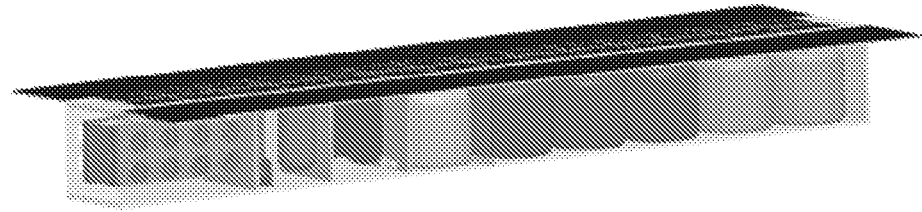
FIGS. 1A, 1B and 2 depict exemplary water harvesting systems.
Figure 1B:
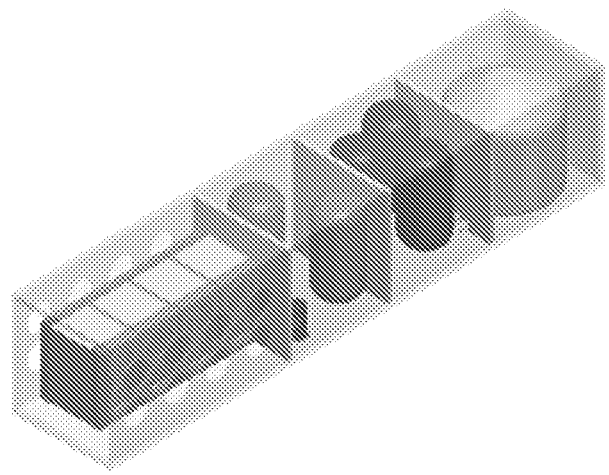
Figure 2:
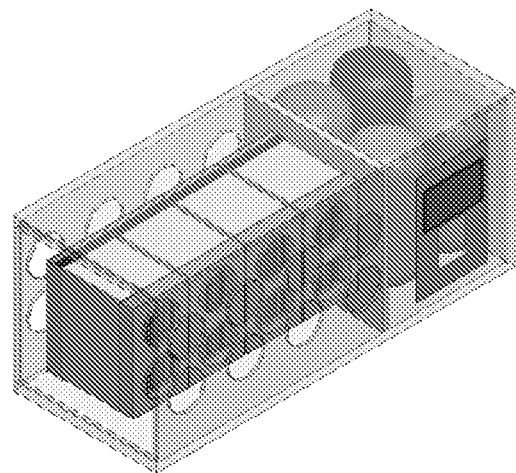

With reference to FIGS. 1A, 1B, and 2, exemplary water harvesting systems are depicted. FIGS. 1A and 1B depict an exemplary solar powered, high efficiency water harvesting system that includes two shipping containers, one for energy storage (water) and one for the process. The system as depicted is fully self-contained. FIG. 2 depict an exemplary electric water harvesting system.

In some embodiments, the systems provided herein have a modular design. The systems are configurable to be stand-alone units to operate using solar, electric power, or a combination of solar and fuel. The systems are easy to deploy, since they can be shipped anywhere in the world and set up quickly.

In some variations, the major sub-systems include solar thermal (e.g., for heating and cooling the water capture material), solar electrical (e.g., for running control system, pumps and fans), adsorption and desorption control, condenser and product water control, and use-interface and remote monitoring.

The various components and configurations of the water harvesting systems, and the methods of using such systems are described in further detail below.

Water Capture Material

In some variations, the water capture material comprises metal-organic-frameworks (MOFs). MOFs are porous materials that have repeating secondary building units (SBUs) connected to organic ligands. In some variations, the SBUs may include one or more metals or metal-containing complexes. In other variations, the organic ligands have acid and/or amine functional group(s). In certain variations, the organic ligands have carboxylic acid groups.

Any suitable MOFs capable of adsorbing and desorbing water may be employed in the systems provided herein. In one variation, MOF-303 may be used, which has a structure of Al(OH)(HPDC), where HPDC stands for 1H-pyrazole-3, 5-dicarboxylate (which may also be referred to as 3,5-PyzDC). Other suitable MOFs may include, for example, CAU-10, MIL-53, MOF-801, MOF-841 and MIL-160. See e.g., Kalmutzki et al., Adv. Mat., 30(37), 1704304 (2018); Furukawa et al., J. Am. Chem. Soc. 2014, 136, 4369-4381. A combination of MOFs may also be used.

In some variations, the MOFs have pore sizes between about 0.5 nm to about 1 nm, or between about 0.7 nm to about 0.9 nm. In certain variations, the MOFs have a hydrophilic pore structure. In certain variations, the MOFs have a hydrophilic pore structure comprising acid and/or amine functional groups. In certain variations, the MOFs have 1D channels that allow for reversible water adsorption.

In other variations, the water capture material is a desiccant material. Any suitable desiccant material may be used.

Any combinations of the water capture materials described herein may also be used.

Water Harvesting Chamber

The systems provided herein have a chamber that houses the water capture material. In some embodiments, the chamber contains a plurality of structural elements, at least a portion of which are coated with the water capture material. Structural elements can be any one, two, or three dimensional elements (e.g., plate, rod, coil, cylinder, etc.), at least a portion of which can be coated with the water capture material. In some embodiments, the chamber contains plates, each independently coated on one or both sides with the water capture material.

Figure 10:
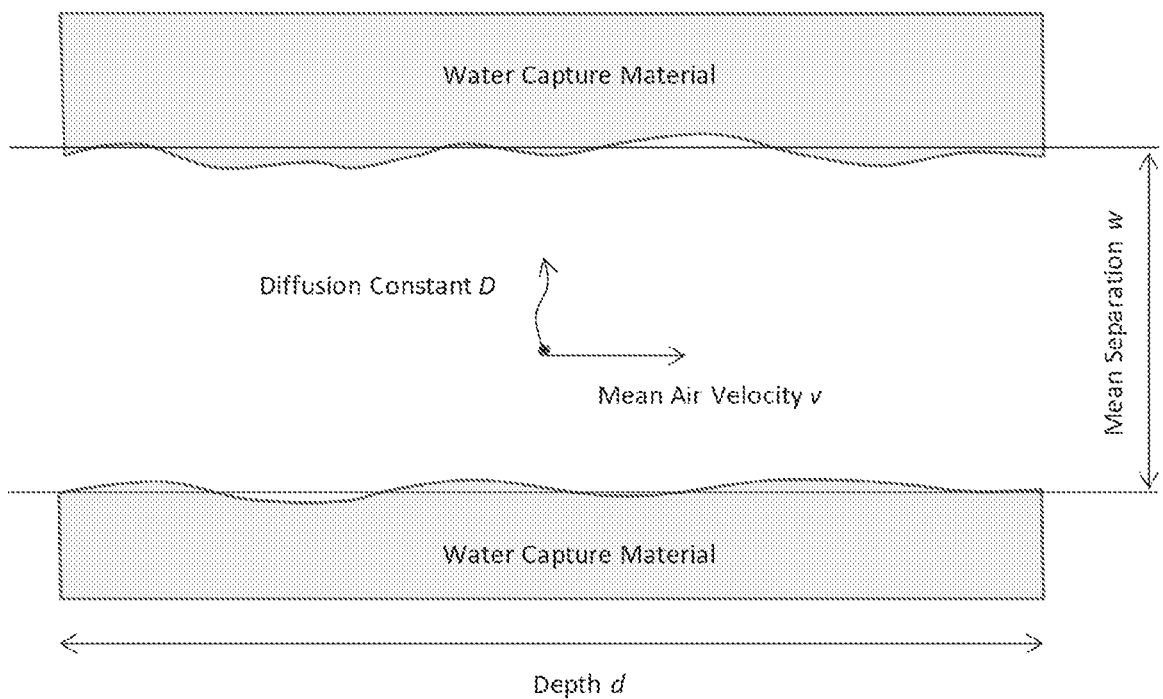
FIG. 10 depicts a schematic illustration describing parameters considered in designing and arranging structural elements to allow for diffusion of water from surrounding air to a water capture material. The figure shows two layers of water capture material, respectively coated on adjacent structural elements, and an exemplary air molecule shown as a dot passing through the gap between those structural elements. The drawing is not to scale.

In some embodiments, the structural elements are designed and arranged to allow for diffusion of water from surrounding air to the water capture material during the adsorption phase. In some embodiments, as schematically illustrated in FIG. 10, the structural elements are designed and arranged in a way such that $d/v > c \times (w/2)^2/D$, where (i) d is the depth of travel by air (excluding water vapor) through the gap between the structural elements during the adsorption phase, (ii) v is the mean velocity of air (carrying water vapor) through the structural elements during the adsorption phase, (iii) c is a constant, (iv) w is the mean separation between the water capture material layers on adjacent structural elements, and (v) D is the diffusion constant or diffusivity of water vapor.

In $d/v > c \times (w/2)^2/D$, the left side of the inequality notation, i.e., d/v, may be referred to as the "transit time" and denoted as $t_{Trans}$. The right side of the inequality notation without the constant c, i.e., $(w/2)^2/D$, may be referred to as the "diffusion time" and denoted as $t_{Diff}$. The condition $d/v > c \cdot (w/2)^2/D$ can be equivalently written as $t_{Trans} > c \times t_{Diff}$, or stated as that the transit time of air molecules is greater than a certain percentage of the diffusion time of water vapor. For example, if c is 30%, the structural elements are arranged such that the transit time is greater than 30% of the diffusion time.

In some variations, the constant c is at least about 5%, at least about 10%, at least about 30%, at least about 50%, or at least about 75%; or between about 1% and about 5%, between about 5% and 50%, between about 10% and about 50%, between about 30% and about 75%, or between about 50% and 150%.

Figure 3A:
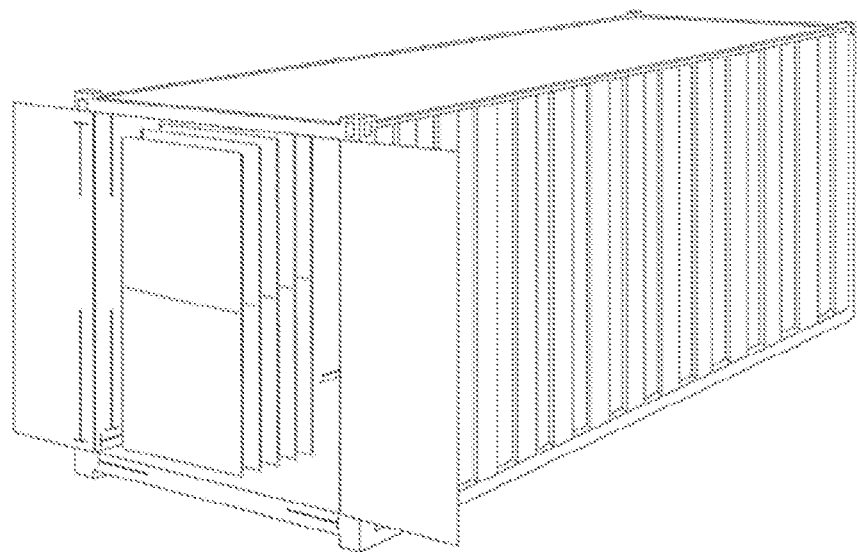
FIGS. 3A and 3B depict exemplary arrangements of the plates inside a chamber of the systems provided herein.
Figure 3B:
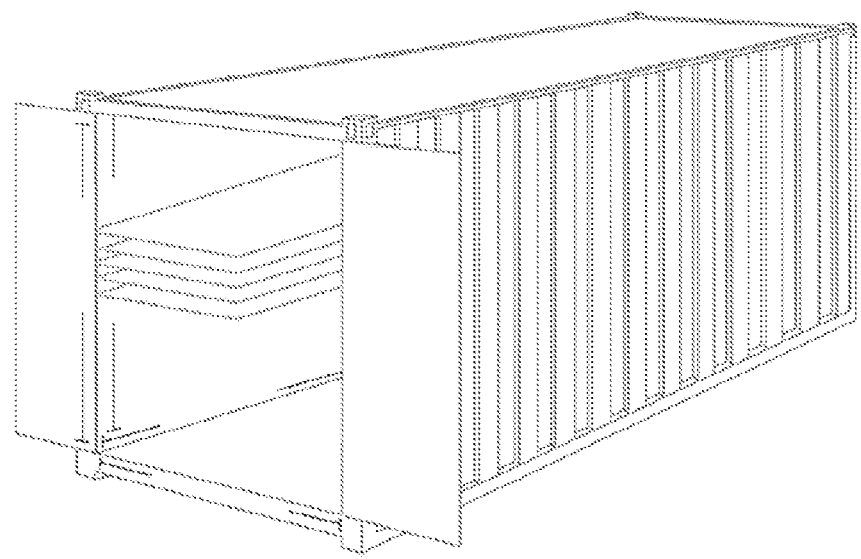

In some embodiments, the structural elements are plates. The plates may be arranged parallel to each other to have a gap between adjacent plates, such that $d/v > 0.3 \times (w/2)^2/D$, where in this case, d is the length of the plates parallel to the air flow during the adsorption phase, and w is the mean separation between the water capture material layers on the adjacent plates. Exemplary plate configurations are depicted in FIGS. 3A and 3B.

The structural elements (e.g., plates, rods, coils, or cylinders etc.) may be made of any suitable material, including any suitable metal. For example, in some variations, the structural elements comprise aluminum. In some variations, the structural elements comprise solid metal.

In certain variations where the structural elements are plates, the plates have a flat surface. In other variations, each plate has a cellular design where its surface is crisscrossed with small channels in a grid pattern, so as to make water capture material areas (e.g., squares) that would allow for thermal expansion mismatch between the plates and the water capture material. In other variations, each plate has a surface textured with topographic features that can enhance water adsorption/desorption performance and/or reliability. In one variation, the topographic features are holes, bumps, ridges, or grooves, or any combination thereof. In another variation, the plates include mesh. For example, in one variation, the plates include aluminum mesh.

In some embodiments, the distance of the gap between adjacent structural elements relative to the depth or length of each structural element achieves optimal air flow and maximizes water adsorption. In some variations the gap between adjacent structural elements is about 1% to about 5% of the depth or length of a structural element.

In some embodiments, the structural elements (e.g., plates, rods, coils, or cylinders etc.) are coated with layers of the water capture material each having a thickness between about 10 microns to about 50 microns. Such thickness of the layer may allow for faster adsorption and desorption (e.g., as compared to thicker layers). In other embodiments, the plates are coated with layers of the water capture material each having a thickness of about 0.1 to about 1 cm. Such thickness of the layer may allow for production of larger water quantities (e.g., as compared to thinner layers).

In certain embodiments, each layer of the water capture material on the structural elements (e.g., plates, rods, coils, or cylinders etc.) has a porosity. In some variations, the porosity is at least about 40%, at least about 50%, at least about 60%, at least about 70%, or at least about 80%; or between about 40% and about 90%, between about 50% and 90%, between about 40% and about 80%, between about 50% and about 80%, or between about 60% and 80%. In other embodiments, the layer of the water capture material is non-porous.

In some embodiments, the thickness of a layer of the water capture material is greater than the thickness of a structural element (e.g., plate, rod, coil, or cylinder etc.). For example, in certain embodiments where the structural elements have a surface structure (e.g., the structural elements are plates) and both sides of the surface are coated with the water capture material, the ratio of the thickness of the first (e.g., top) layer of the water capture material to the thickness of the surface structure to the thickness of the second (e.g., bottom) layer of the water capture material optimizes desorption of water and energy used to heat the structural elements in the chamber. In some variations, where the layers are non-porous, the thickness of each layer of the water capture material may be at least greater than half of the structure thickness.

In some variations of the foregoing, the layers of the water capture material may be mixed with one or more additional components. In some variations, a binder may be mixed into the layer. In certain variations, silicone binder may be used. In one variation, a silicone resin binder may be used. In certain variations, the layer may further comprise one or more materials to help with thermal conductivity, to speed up transfer. In one variation, the layer further comprises graphite.

In certain variations, the water capture material is uniformly distributed on the structural elements (e.g., plates, rods, coils, or cylinders etc.). Any suitable techniques known in the art may be employed to coat the layers of the water capture material on the structural elements. For example, in one variation, the layers of water capture material are deposited onto the structural elements.

The chamber also has condenser(s) positioned adjacent to one end of the structural elements. The condensers convert water vapor into liquid water. In some variations, multiple condensers are used. In one variation where multiple condensers are used, the condensers are serially arranged.

The chamber also has gate valve(s) that open during adsorption and close after adsorption. The chamber also has heat exchange manifold(s) connected to, or positioned around, the structural elements. The heat exchange manifolds heat up at least a portion of the structural elements (e.g., by circulating hot process water or other heat transfer agents, irradiation, electric heating, etc.), thereby causing desorption of at least a portion of water sequestered in the water capture material. In some variations, the chamber also has internal fan(s) positioned adjacent to the plurality of structural elements at an end opposite to at least one condenser. The fans blow air through a gap between adjacent structural elements towards the condensers. In some variations, the air is blown parallel to the structural elements. This causes the water capture material to adsorb water from surrounding air during adsorption. In other variations, the fans may be external to the chamber, positioned in close proximity to the structural elements.

Figure 4:
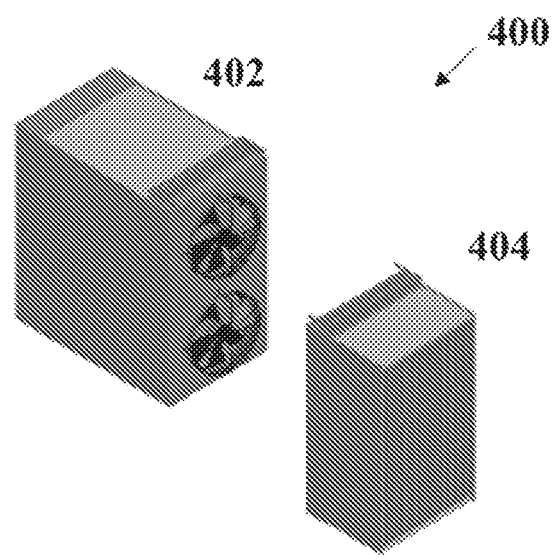
FIG. 4 provides a cross-sectional view of an exemplary module, which includes internal fans, structural elements coated with water capture material, and one or more condensers.

In some variations, the chamber is made up of one or more modules, where each module has the structural elements and condenser(s), and also fan(s) if internal to the chamber. FIG. 4 illustrates a cross-sectional view of exemplary module 400. Unit 402 in the exemplary module contains internal fans and unit 404 contains structural elements coated with water capture material and one or more condensers.

During the adsorption phase, the fans turn on to create air flow that passes through the gaps between adjacent structural elements and there is a heat exchanger for air cooling. In the desorption phase, the chamber may be depressurized, and the heating of the water capture material causes desorption of water in the form of water vapor. In the condensation phase, the condenser and heat exchanger may work together to condense the water vapor to produce liquid water, which may be collected in each module. The modules can easily be loaded, as well as connected together.

Adsorption

Figure 5A:
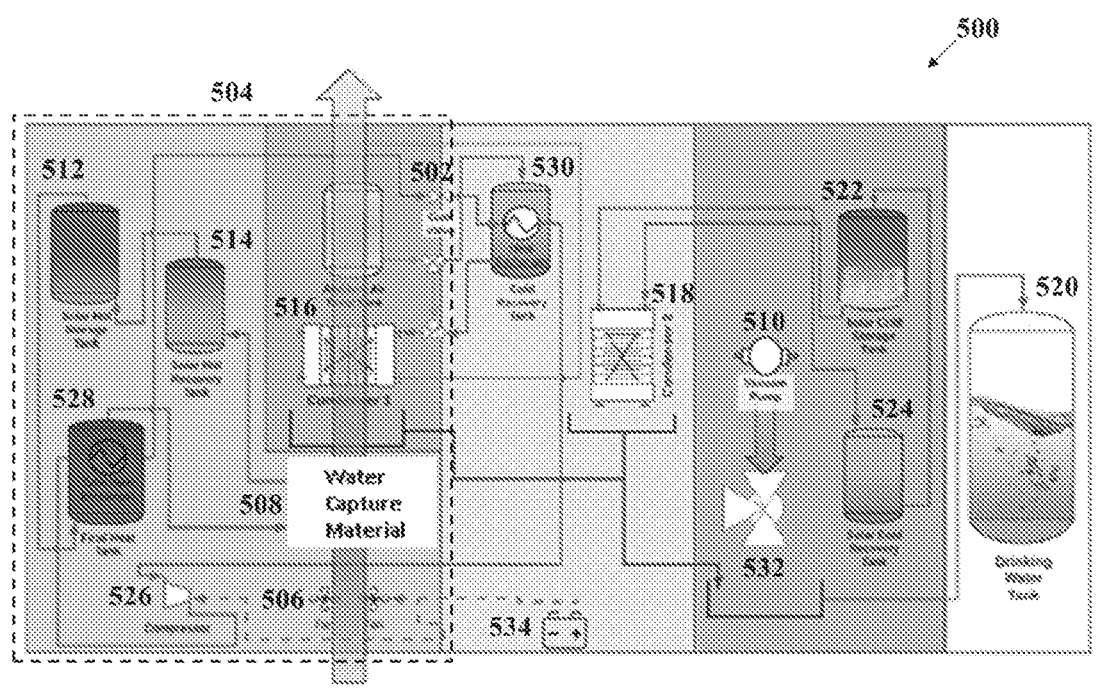
FIGS. 5A and 5B depict a schematic for an exemplary water harvesting system operating in the adsorption and desorption phases, respectively.

FIG. 5A illustrates water harvesting system 500. During the adsorption phase, one or more gate valves 502 to chamber 504 are open, and one or more fans 506 blow air through the structural elements coated with one or more water capture material in unit 508, and progressively saturates the water capture material with water. The geometry of the structural elements in unit 508, their spacing, and the thickness of the layers of water capture material are designed to maximize the amount of water produced, and to minimize its production cost. For instance, the air flow through the structural elements in unit 508 needs to be slow enough to allow for water molecules to travel to the water capture material by diffusion (perpendicular to the air flow), and also to ensure laminar flow, but it also has to be fast enough to minimize process time. Also, the layers of water capture material in unit 508 have to exhibit good adhesion to the structural elements, and good mechanical integrity in order to sustain high air velocities.

Desorption

Figure 5B:
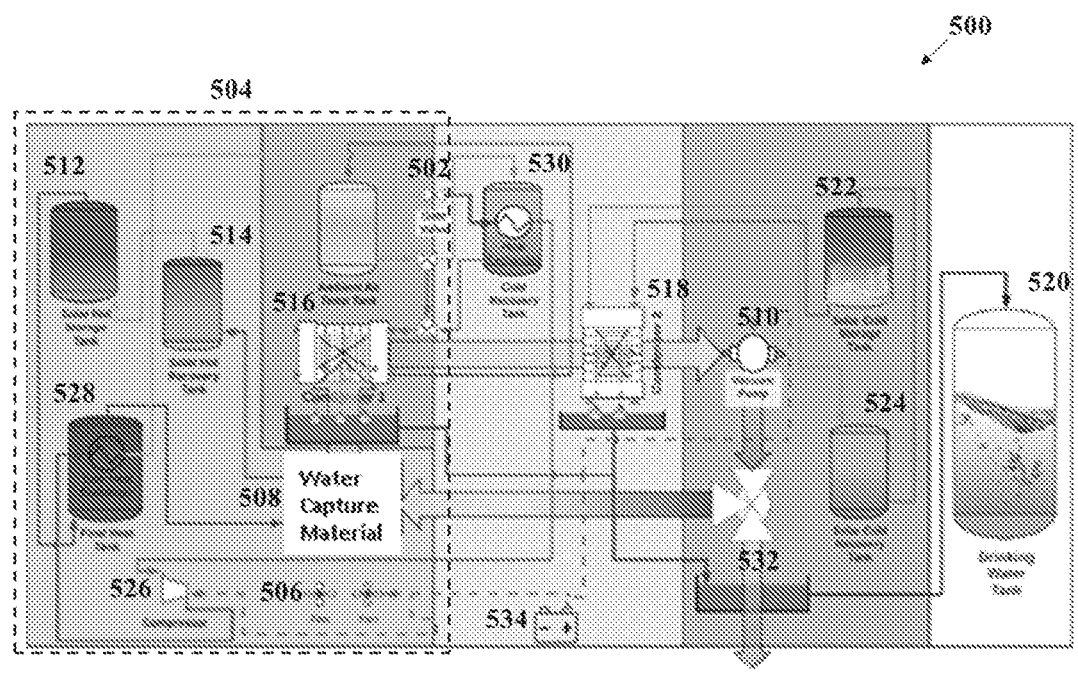
Figure 7A:
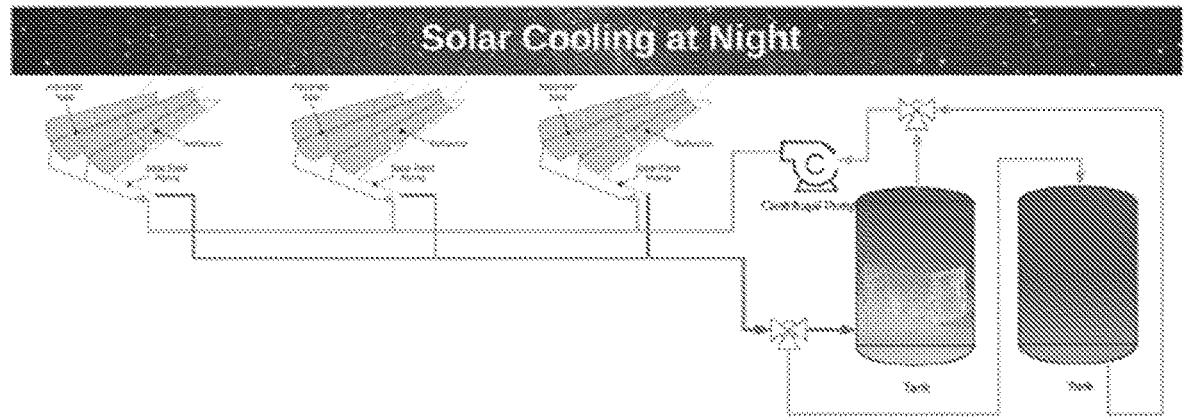
FIG. 7A depicts solar cooling at night.
Figure 7B:
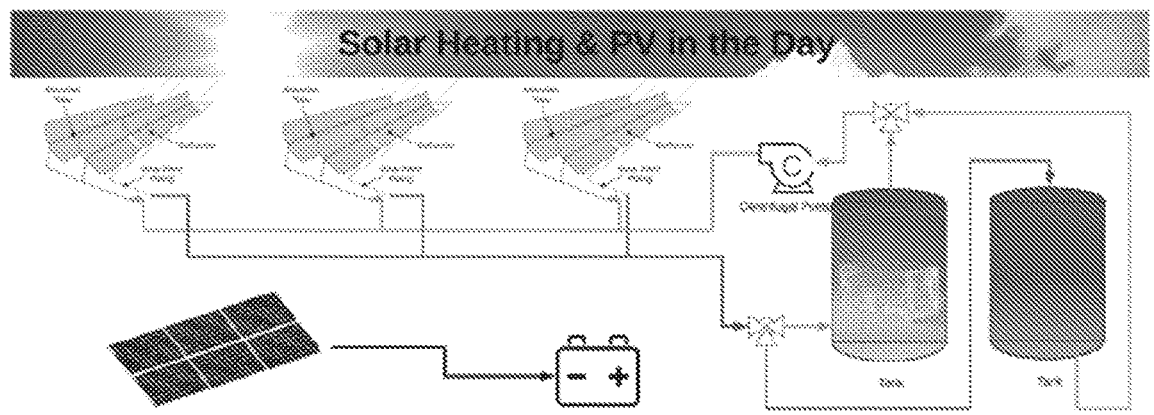
FIG. 7B depicts solar heating and use of PV in the day.
Figure 11:
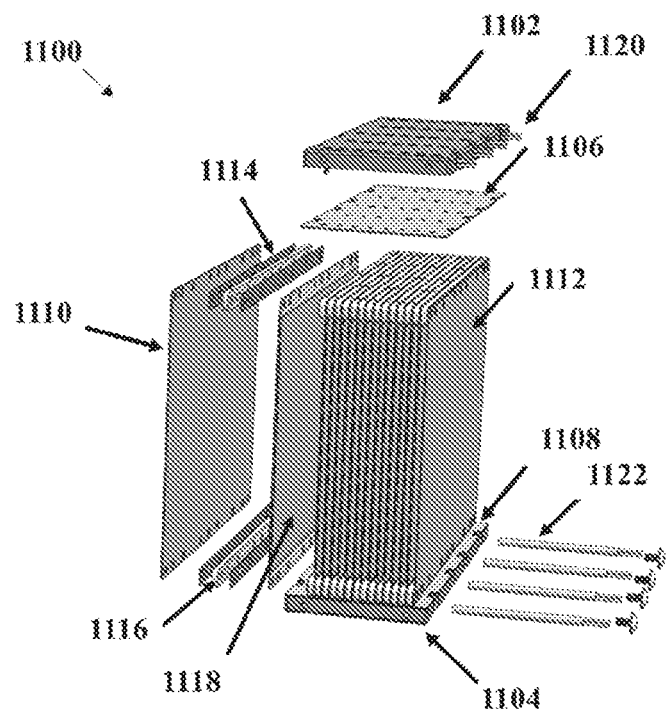
FIG. 11 depicts an exemplary assembly of a plurality of structural elements (plates in this case) coated with a water capture material (MOF in this case).

FIG. 5B illustrates water harvesting system 500. After the adsorption phase is complete, one or more fans 506 turn off and one or more gate valve 502 close the chamber 504. One or more vacuum pumps 510 then start evacuating the air out of chamber 504. When all the air is evacuated, the heat exchange manifolds in unit 508 heat up at least a portion of the structural elements in unit 508, for example, by circulating hot process water inside heat exchanger manifolds. For example, in one variation, there may be two heat exchanger manifolds, situated on both ends (e.g., top and bottom) of the structural elements, as illustrated in FIG. 11. This allows the structural elements in unit 508 to heat up, allowing the water sequestered in the layers of water capture material in unit 508 to start desorbing. In some variations, the hot process water is generated using passive solar water collectors (as illustrated in FIG. 7B and in some variations, using one or more solar hot storage tanks 512 and/or solar hot recovery tanks 514, which could be inside or outside chamber 504). The hot process water could also be supplemented, or fully generated, using an external heat source (e.g., fuel or electrical heater). In some variations, an external heat source (e.g., fuel or electrical heater) could be configured to heat at least one heat exchange manifold, with or without using the hot process water.

Condensation

With reference again to FIG. 5B, one or more condenser units 516 and/or 518 are positioned downstream of unit 508 that allow for the water vapor to condense, and the liquid water is then pumped away to storage tank 520. The condenser units can be inside chamber 504 as condenser unit 516 and/or outside chamber 504 as condenser unit 518. When cold process water is used to provide the low temperature necessary for water condensation to occur in the condenser units 516 and/or 518, this cold water can be either collected at night time using radiative cooling by the same panels that generate hot water during the day (as illustrated in FIG. 7A and in some variations, using one or more solar cold storage tanks 522 and/or solar cold recovery tanks 524, which could be inside or outside chamber 504) and/or generated using one or more air conditioning compressors 526. When hot process water is used in the heat exchange manifolds in 508, the hot side of air conditioning compressor 526 is connected to one or more hot process water tank 528, allowing for the recycling of the energy collected during condensation, using heat pump(s). This can help to reduce the energy cost per liter of water produced in the systems provided herein. Air conditioning compressor 526 can also be connected to one or more cold recovery tanks 530.

With reference to FIGS. 5A and 5B, there could be additional elements in water harvesting system 500. For example, one or more valve 532 can assist in pulling a vacuum in chamber 504 during desorption and condensation. In some embodiments, one or more electric power units 534 can assist operation of, for example, air conditioning compressor 526.

In some embodiments, the heat pump(s) may be powered by solar. In some variations, the heat pump(s) may be used to provide primary condensation, for example, between about 60° C. to about 25° C. For example, one or more solar panels may be used to power the heat pumps. Radiant solar cooling may be used to provide remaining cooling, for example, between about 25° C. to about 15° C.

While a portion of water may be recovered in the condenser(s) of the system, in some variations, not 100% of the water may be recovered. As such, in certain embodiments, the systems provided herein further include a scavenger bed of additional water capture material. Such scavenger bed may be used for residual water scavenging.

In other embodiments, adsorption regeneration may be performed in vacuum to decrease cycle time and/or to help manage sensible heat.

Power Sources

In some variations, the systems provided herein further include one or more solar power source(s). In certain variations, the systems further include photovoltaic (PV) cells or passive solar captors, or a combination thereof.

FIG. 7A depicts components of the system for solar cooling at night. Solar thermal cooling may provide cooling for condensing in the system. FIG. 7B depicts components of the system for solar heating and PV during the day. Solar thermal heating may provide energy for heating the structural elements (e.g., plates, rods, coils, or cylinders etc.) coated with the water capture material. Solar PV may provide electric power to the system, for example, the compressor of the heat pump, the vacuum pump, fans for adsorption, and the control system.

Figure 6:
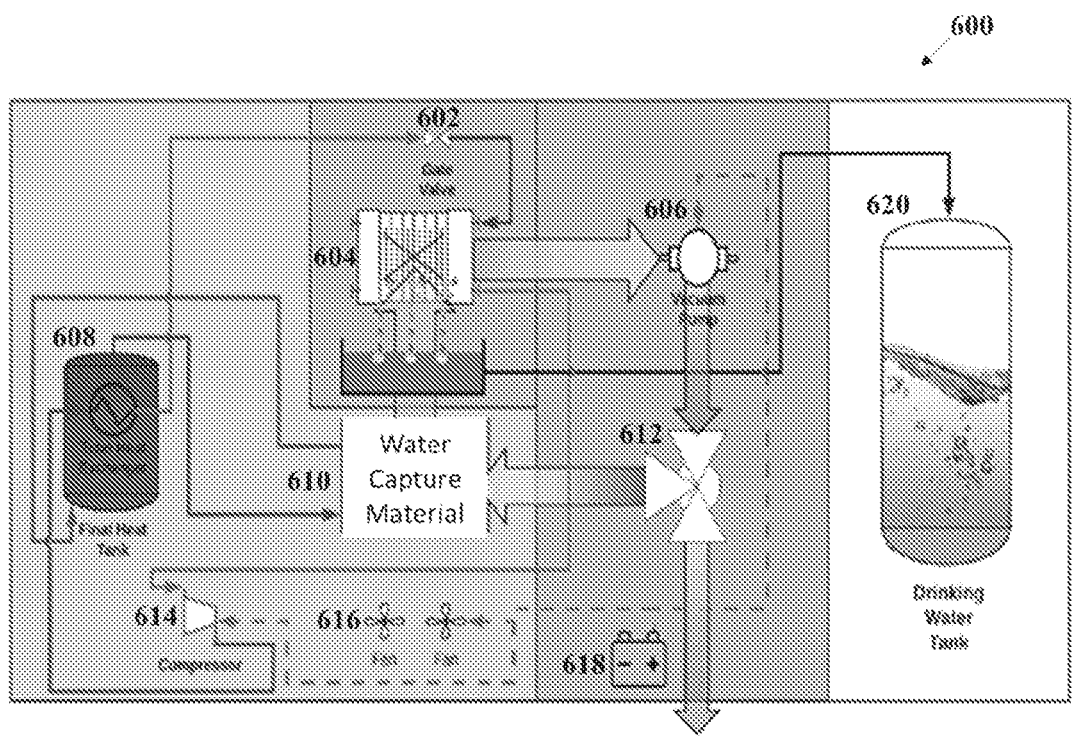
FIG. 6 depicts a schematic for another exemplary water harvesting system with an electric power design.

In other variations, the exemplary systems provided herein may be partially or fully powered by electricity. With reference to FIGS. 2 and 6, exemplary systems powered solely by electricity are depicted. FIG. 6 illustrates water harvesting system 600 that can contain gate valve 602, condenser unit 604, vacuum pump 606, heat tank 608, unit 610 with structural elements coated with water capture material and heat exchange manifolds, three-way valve 612, air conditioning compressor 614, fan or group of fans 616, electric power unit 618, and water tank 620.

Each element depicted or mentioned in or with reference to FIGS. 5A, 5B, and 6 can be one, more than one, or chosen to be left out or replaced by another functionally similar unit for a particular water harvesting system. The placement of each element could be flexibly arrange to achieve water harvesting.

Control System

Figure 8:
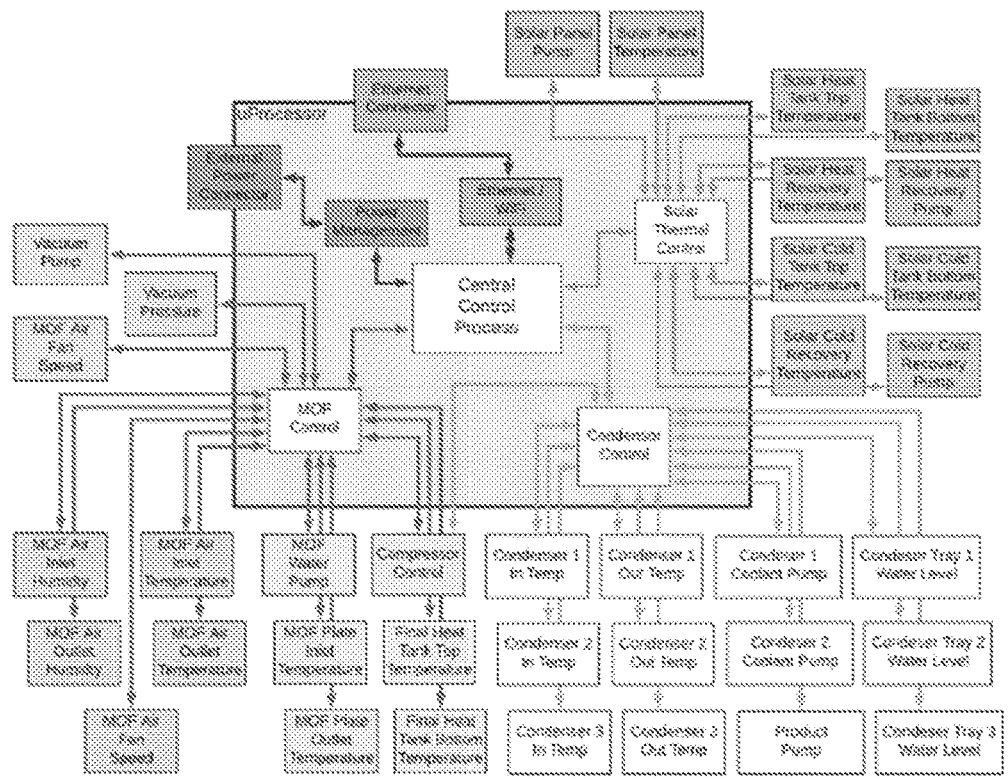
FIG. 8 depicts an exemplary control system architecture for use in the systems provided herein.

In some embodiments, the systems provided herein further include a control system that monitors and controls adsorption, desorption and condensation. For example, with reference to FIG. 8, the control system includes sensors and at least one processor unit.

For example, after the all the water has come off from the water capture material and has been fully collected in the tank, air is allowed back in the chamber, and a new cycle of adsorption/desorption/condensation starts. Depending on process conditions, multiple cycles can be performed in one day, maximizing the amount of water produced. In some variations, 10 to 100 cycles can be performed in one day.

In some variations of the systems, one or more of the process steps are controlled by a processor unit. In certain variations, all the process steps are controlled by a processor unit. The control system can adjust run conditions based on readings of the environment.

Air flow during adsorption, for instance, may be stopped automatically when the chamber is saturated, which may be controlled by a humidity sensor placed downstream of the unit. The same sensor may also help monitor the desorption/condensation process. Furthermore, in certain variations, temperature sensors in the structural elements (e.g., plates, rods, coils, or cylinders etc.) and on the condenser coils may be used to control the flow of both hot and cold process water. In certain variations, the system is networked, even in remote locations using satellite links, and process information may be monitored in real time by the control system.

Enumerated Embodiments

The following enumerated embodiments are representative of some aspects of the invention.

1. A water harvesting system for capturing water from surrounding air, comprising:
   a chamber, comprising:
      a plurality of plates,
         wherein each plate is independently coated on one or both sides with at least one water capture material,
         wherein the plates are arranged parallel to each other and a gap exists between adjacent plates, and
         wherein the at least one water capture material adsorbs water from surrounding air during an adsorption phase, and desorbs water in the form of water vapor during a desorption phase;
      at least one condenser positioned adjacent to one end of the plurality of plates, configured to condense water vapor into liquid water during a condensation phase;
      at least one gate valve configured to open during adsorption and close after adsorption; and
      at least one heat exchange manifold connected to, or positioned around, the plurality of plates, configured to heat up at least a portion of the plates by circulating hot process water, thereby causing desorption of at least a portion of water sequestered in the water capture material;
   at least one fan positioned adjacent to the plurality of plates at an end opposite to the at least one condenser, configured to blow air through a gap between adjacent plates towards the at least one condenser, thereby causing the at least one water capture material to adsorb water from surrounding air during adsorption;
   at least one vacuum pump connected to the chamber, configured to evacuate at least a portion of air out of the chamber when the at least one gate valve is closed; and
   a water storage tank, configured to receive the liquid water from the at least one condenser in the chamber.

2. The system of embodiment 1, wherein the water capture material comprises metal-organic-framework.

3. The system of embodiment 1, wherein the water capture material is a desiccant material.

4. The system of any one of embodiments 1 to 3, further comprising:
   at least one hot water storage tank connected to the at least one heat exchange manifold, configured to provide hot process water to the at least one heat exchange manifold.

5. The system of any one of embodiments 1 to 4, further comprising:
   at least one hot water recovery tank connected to the chamber, configured to receive process water from the at least one heat exchange manifold in the chamber after desorption.

6. The system of any one of embodiments 1 to 5, further comprising:
   at least one cold storage tank connected to the at least one condenser in the chamber, configured to circulate cold process water through the at least one condenser.

7. The system of any one of embodiments 1 to 6, further comprising:
   at least one cold recovery tank connected to the at least one condenser in the chamber, configured to receive process water from the at least one condenser after condensation.

8. The system of any one of embodiments 1 to 7, further comprising:
   at least one compressor configured to pump energy from at least one condenser or at least one cold recovery tank to at least one heat exchange manifold during and/or after condensation.

9. The system of any one of embodiments 1 to 8, wherein each plate in the chamber is a metal plate.

10. The system of embodiment 9, wherein the metal plate comprises aluminum.

11. The system of any one of embodiments 1 to 19, wherein each plate has a surface textured with topographic features.

12. The system of embodiment 11, wherein the topographic features are holes, bumps, ridges, or grooves, or any combination thereof.

13. The system of any one of embodiments 1 to 12, wherein the distance of the gap between adjacent plates relative to the length of each plate achieves optimal air flow and maximizes water adsorption.

14. The system of any one of embodiments 1 to 13, wherein both sides of each plate is coated with the at least one water capture material.

15. The system of embodiment 14, wherein each layer has a thickness and each plate has a thickness, and wherein the ratio of the thickness of the first layer to the thickness of the plate to the thickness of the second layer optimizes desorption of water and energy used to heat the plurality of the plates in the chamber.

16. The system of any one of embodiments 1 to 15, wherein the at least one fan is internal to the chamber.

17. The system of any one of embodiments 1 to 15, wherein the at least one fan is external to the chamber.

18. The system of any one of embodiments 1 to 17, wherein the at least one fan is configured to blow air having a laminar flow through the gap between adjacent plates.

19. The system of any one of embodiments 1 to 18, wherein the at least one fan is configured to blow air at an air flow rate (i) slow enough to allow for water to travel to the at least one water capture material by diffusion, and (ii) fast enough to minimize process time.

20. The system of any one of embodiments 1 to 19, further comprising a control system configured to monitor and control adsorption, desorption and condensation, wherein the control system comprises:
   a plurality of sensors; and
   at least one processor unit.
21. The system of any one of embodiments 1 to 20, further comprising: photovoltaic cells or passive solar captors, or a combination thereof.
22. The system of any one of embodiments 1 to 21, further comprising: at least one external heat source configured to heat the process water.
23. A method of harvesting water from surrounding air using a water harvesting system of any one of embodiments 1 to 22, the method comprising:
   adsorbing water in at least a portion of the water capture material;
   desorbing at least a portion of the water adsorbed in the water capture material in the form of water vapor; and
   condensing at least a portion of the water vapor to liquid water.
24. A method of harvesting water from surrounding air, comprising:
   adsorbing water from surrounding air in at least one water capture material, wherein the at least one water capture material is coated on one or both sides of each plate in a plurality of plates positioned inside a chamber;
   desorbing at least a portion of the water from the at least one water capture material in the form of water vapor by heating the plurality of plates in the chamber; and
   condensing at least a portion of the water vapor using at least one condenser to produce liquid water.
25. The method of embodiment 23 or 24, further comprising pumping the liquid water to at least storage tank.
26. The method of embodiment 23 or 24, further comprising storing the liquid water.
27. A water harvesting system for capturing water from surrounding air, comprising:
   a chamber, comprising:
      a plurality of structural elements,
         wherein at least a portion of each structural element is coated with at least one water capture material,
         wherein the structural elements are arranged to allow for diffusion of water from surrounding air to the at least one water capture material during an adsorption phase, and
         wherein the at least one water capture material adsorbs water from surrounding air during the adsorption phase, and desorbs water in the form of water vapor during a desorption phase;
      at least one condenser positioned adjacent to one end of the plurality of structural elements, configured to condense water vapor into liquid water during a condensation phase;
      at least one gate valve configured to open during adsorption and close after adsorption; and
      at least one heat exchange manifold connected to, or positioned around, the plurality of structural elements, configured to heat up at least a portion of the structural elements, thereby causing desorption of at least a portion of water sequestered in the water capture material;
   at least one fan positioned adjacent to the plurality of structural elements at an end opposite to the at least one condenser, configured to blow air through a gap between adjacent structural elements towards the at least one condenser, thereby causing the at least one water capture material to adsorb water from surrounding air during adsorption;
   at least one vacuum pump connected to the chamber, configured to evacuate at least a portion of air out of the chamber when the at least one gate valve is closed; and
   a water storage tank, configured to receive the liquid water from the at least one condenser in the chamber.
28. The system of embodiment 27, wherein the structural elements are arranged such that the transit time is greater than 30% of the diffusion time.
29. The system of embodiment 27, wherein the water capture material comprises metal-organic framework or a desiccant material.
30. The system of any one of embodiments 27 to 29, further comprising:
   at least one hot water storage tank connected to the at least one heat exchange manifold, configured to provide hot process water to the at least one heat exchange manifold.
31. The system of any one of embodiments 27 to 30, further comprising:
   at least one hot water recovery tank connected to the chamber, configured to receive process water from the at least one heat exchange manifold in the chamber after desorption.
32. The system of any one of embodiments 27 to 31, further comprising:
   at least one cold storage tank connected to the at least one condenser in the chamber, configured to circulate cold process water through the at least one condenser.
33. The system of any one of embodiments 27 to 32, further comprising:
   at least one cold recovery tank connected to the at least one condenser in the chamber, configured to receive process water from the at least one condenser after condensation.
34. The system of any one of embodiments 27 to 33, further comprising:
   at least one compressor configured to pump energy from at least one condenser or at least one cold recovery tank to at least one heat exchange manifold during and/or after condensation.
35. The system of any one of embodiments 27 to 34, wherein the structural elements in the chamber comprises metal plates.
36. The system of embodiment 35, wherein the metal plate comprises aluminum.
37. The system of any one of embodiments 27 to 36, wherein each structural element has a surface textured with topographic features.
38. The system of embodiment 37, wherein the topographic features are holes, bumps, ridges, or grooves, or any combination thereof.
39. The system of any one of embodiments 27 to 38, wherein the distance of the gap between adjacent structural elements relative to the length of each structural element achieves optimal air flow and maximizes water adsorption.
40. The system of any one of embodiments 35 or 36, wherein both sides of each plate is coated with at least one layer of the at least one water capture material.
41. The system of embodiment 40, wherein each layer of the at least one water capture material has a thickness and each plate has a thickness, and wherein the ratio of the thickness of the layer of the water capture material to the thickness of the plate optimizes desorption of water and energy used to heat the plurality of the plates in the chamber.
42. The system of any one of embodiments 27 to 40, wherein the at least one fan is internal to the chamber.

43. The system of any one of embodiments 27 to 40, wherein the at least one fan is external to the chamber.
44. The system of any one of embodiments 27 to 43, wherein the at least one fan is configured to blow air having a laminar flow through the gap between adjacent structural elements.
45. The system of any one of embodiments 27 to 43, wherein the at least one fan is configured to blow air at an air flow rate (i) slow enough to allow for water to travel to the at least one water capture material by diffusion, and (ii) fast enough to minimize process time.
46. The system of any one of embodiments 27 to 45, further comprising a control system configured to monitor and control adsorption, desorption and condensation, wherein the control system comprises:
   at least one sensor; and
   at least one processor unit.
47. The system of any one of embodiments 27 to 46, further comprising: photovoltaic cells or passive solar captors, or a combination thereof.
48. The system of any one of embodiments 27 to 46, further comprising: at least one external heat source configured to heat the at least one heat exchange manifold.
49. A method of harvesting water from surrounding air using a water harvesting system of any one of embodiments 27 to 48, the method comprising:
   adsorbing water in at least a portion of the water capture material;
   desorbing at least a portion of the water adsorbed in the water capture material in the form of water vapor; and
   condensing at least a portion of the water vapor to liquid water.
50. A method of harvesting water from surrounding air, comprising:
   adsorbing water from surrounding air in at least one water capture material, wherein the at least one water capture material is coated on each structural element in a plurality of structural elements positioned inside a chamber;
   desorbing at least a portion of the water from the at least one water capture material in the form of water vapor by heating the plurality of structural elements in the chamber; and
   condensing at least a portion of the water vapor using at least one condenser to produce liquid water.
51. The method of embodiment 49 or 50, further comprising pumping the liquid water to at least one storage tank.
52. The method of embodiment 49 or 50, further comprising storing the liquid water.

EXAMPLES

The following Examples are merely illustrative and are not meant to limit any aspects of the present disclosure in any way.

Example 1

A Water Harvesting System to Produce Drinking Water

Plates coated with MOF-303 were arranged as illustrated in exemplary unit 1100 depicted in FIG. 11. Unit 1100 includes upper heater plate 1102 and lower heater plate 1104, upper thermal pad 1106 and lower thermal pad 1108, covers 1110 and 1112, thermal pads 1114, spacers 1116, MOF-coated plates 1118, upper cartridge heaters 1120 and lower cartridge heaters 1122. This unit was used in an exemplary water harvesting system to collect water.

Figure 9:
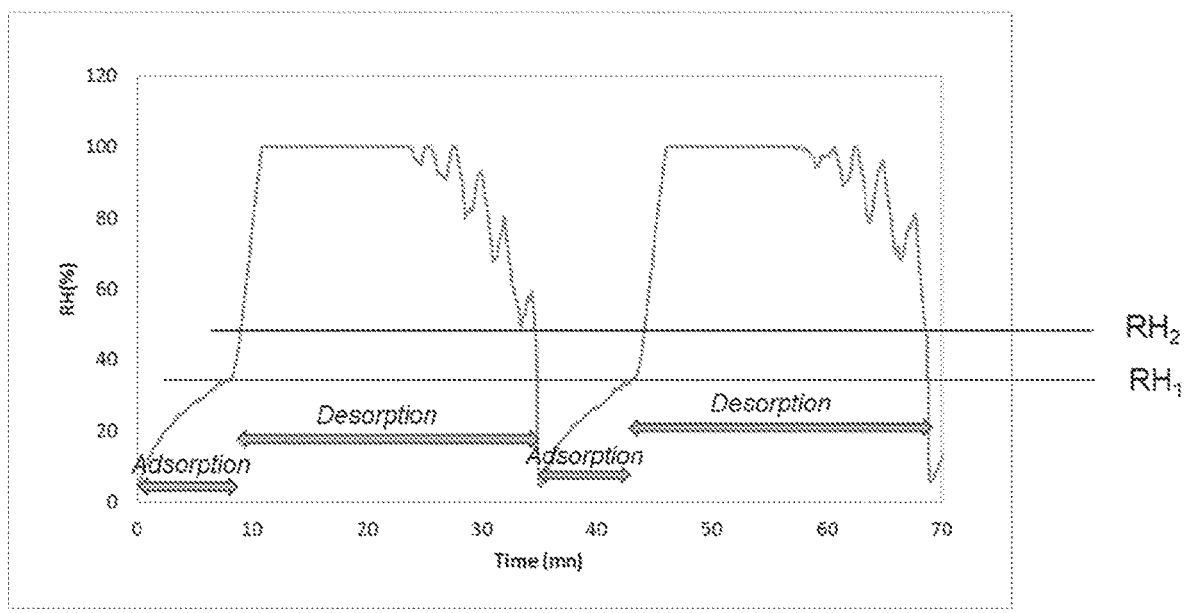
FIG. 9 depicts relative humidity (RH) in an exemplary water harvesting system during water harvesting cycles.

As shown in FIG. 9, adsorption proceeded until humidity at the exit of unit 1100 reached a preset limit $RH_1$, around 90% of ambient humidity or around 35% of relative humidity (RH) in this example. When $RH_1$ was reached, the system switched to desorption, allowing water to come out of the MOF. Desorption proceeded until humidity at the exit of unit 1100 reaches a preset limit $RH_2$, around 50% RH in this example. When $RH_2$ was reached, the system switched back to adsorption.

The exemplary water harvesting system was run and tested several times over the course of 200 days. Performance was monitored for productivity, as measured in the amount of water produced per adsorption/desorption cycle, and also the amount of water produced per day. The results are summarized in Table 1 below.

TABLE 1

Results summary

| Category | Amount |
|---|---|
| Water Produced (L) | 7.4 |
| Number of Cycles | 1141 |
| Time (hrs) | 452 |
| Mean Cycle Time (min) | 23.8 |
| $H_2O(g)$/Cycle | 6.5 |
| $H_2O(g)$/Day | 394 |

Figure 12:
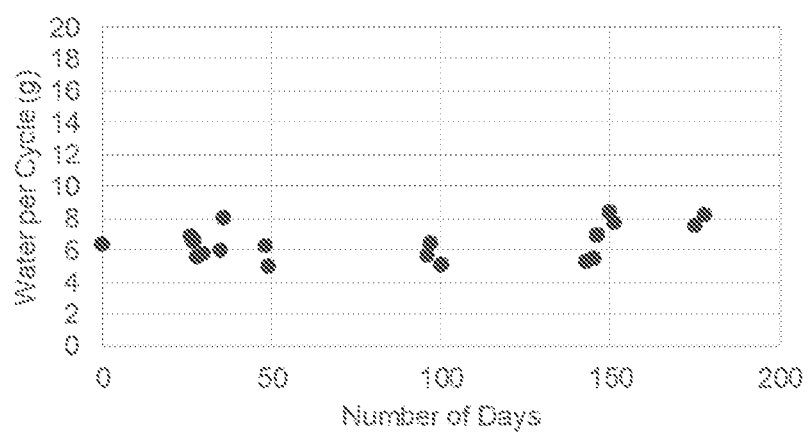
FIG. 12 depicts an exemplary data showing liquid water collected per adsorption/desorption cycle with an exemplary water harvesting system, measured at various time points over the course of 200 days.

No deterioration was observed, and the water amount per cycle averaged about 7 g/cycle (FIG. 12). Small variations around the mean in FIG. 12 are likely attributed to changes in absolute humidity in the atmosphere.

What is claimed is:
1. A water harvesting system for capturing water from surrounding air, comprising:
   a chamber, comprising:
      a plurality of plates,
         wherein each plate is independently coated on one or both sides with at least one water capture material,
         wherein the plates are arranged parallel to each other and a gap exists between adjacent plates, and
         wherein the at least one water capture material adsorbs water from surrounding air during an adsorption phase, and desorbs water in the form of water vapor during a desorption phase;
      at least one condenser positioned adjacent to one end of the plurality of plates, configured to condense water vapor into liquid water during a condensation phase;
      at least one gate valve configured to open during adsorption and close after adsorption; and
      at least one heat exchange manifold connected to, or positioned around, the plurality of plates, configured to heat up at least a portion of the plates, thereby causing desorption of at least a portion of water sequestered in the water capture material;
   at least one fan positioned adjacent to the plurality of plates at an end opposite to the at least one condenser, configured to blow air through the gap between adjacent plates towards the at least one condenser, thereby causing the at least one water capture material to adsorb water from surrounding air during adsorption;
   at least one vacuum pump connected to the chamber, configured to evacuate at least a portion of air out of the chamber when the at least one gate valve is closed; and a water storage tank, configured to receive the liquid water from the at least one condenser in the chamber.

2. The system of claim 1, wherein the water capture material comprises metal-organic-framework.

3. The system of claim 1, further comprising:
at least one hot water storage tank connected to the at least one heat exchange manifold, configured to provide hot process water to the at least one heat exchange manifold.

4. The system of claim 1, further comprising:
at least one hot water recovery tank connected to the chamber, configured to receive process water from the at least one heat exchange manifold in the chamber after desorption.

5. The system of claim 1, further comprising:
at least one cold storage tank connected to the at least one condenser in the chamber, configured to circulate cold process water through the at least one condenser.

6. The system of claim 1, further comprising:
at least one cold recovery tank connected to the at least one condenser in the chamber, configured to receive process water from the at least one condenser after condensation.

7. The system of claim 1, further comprising:
at least one compressor configured to pump energy from at least one condenser or at least one cold recovery tank to at least one heat exchange manifold during and/or after condensation.

8. The system of claim 1, wherein each plate in the chamber is a metal plate.

9. The system of claim 8, wherein the metal plate comprises aluminum.

10. The system of claim 1, wherein each plate has a surface textured with topographic features.

11. The system of claim 10, wherein the topographic features are holes, bumps, ridges, or grooves, or any combination thereof.

12. The system of claim 1, wherein the distance of the gap between adjacent plates relative to the length of each plate achieves optimal air flow and maximizes water adsorption.

13. The system of claim 1, wherein both sides of each plate is coated with at least one layer of the at least one water capture material.

14. The system of claim 13, wherein each layer of the at least one water capture material has a thickness and each plate has a thickness, and wherein the ratio of the thickness of the layer of the water capture material to the thickness of the plate optimizes desorption of water and energy used to heat the plurality of the plates in the chamber.

15. The system of claim 1, further comprising a control system configured to monitor and control adsorption, desorption and condensation, wherein the control system comprises:
at least one sensor; and
at least one processor unit.

16. The system of claim 1, further comprising: photovoltaic cells or passive solar captors, or a combination thereof.

17. A method of harvesting water from surrounding air using a water harvesting system of claim 1, the method comprising:
adsorbing water in at least a portion of the water capture material;
desorbing at least a portion of the water adsorbed in the water capture material in the form of water vapor; and
condensing at least a portion of the water vapor to liquid water.

18. The method of claim 17, further comprising pumping the liquid water to at least one storage tank.

19. The method of claim 17, further comprising storing the liquid water.

* * * * *